US006086985A

United States Patent [19]

Shaw-Klein et al.

[11] Patent Number: 6,086,985

[45] Date of Patent: Jul. 11, 2000

[54] INK JET RECORDING ELEMENT

[75] Inventors: Lori J. Shaw-Klein, Rochester, N.Y.; Elizabeth G. Burns, Salem, N.H.; John Dicillo, Rochester, N.Y.

[73] Assignee: Eastman Kodak Company, Rochester, N.Y.

[21] Appl. No.: 09/174,946

[22] Filed: Oct. 19, 1998

[51] Int. Cl.[7] .................... B32B 3/26

[52] U.S. Cl. .................... 428/304.4; 428/195; 428/315.5; 428/500; 347/105

[58] Field of Search .................... 428/195, 211, 428/332, 409, 341, 342, 413, 474.4, 500, 304.4, 317.9, 315.5, 339; 347/105

[56] References Cited

U.S. PATENT DOCUMENTS

| | | | |
|---|---|---|---|
| 4,861,644 | 8/1989 | Young et al. | 428/195 |
| 5,101,218 | 3/1992 | Sakaki et al. | 346/1.1 |
| 5,439,739 | 8/1995 | Furukawa et al. | 428/341 |

FOREIGN PATENT DOCUMENTS

| | | |
|---|---|---|
| WO 97/33758 | of 0000 | European Pat. Off. . |

*Primary Examiner*—Bruce H. Hess
*Assistant Examiner*—Michael E Grendzynski
*Attorney, Agent, or Firm*—Harold E. Cole

[57] ABSTRACT

An ink jet recording element comprising the following layers in the order recited:

I) a support of a solvent-absorbing, porous material, and

II) an image-recording layer comprising a vinyl, latex polymer having the following formula:

$$—A_x—B_y—C_z—$$

wherein:

A is a hydrophilic, vinyl monomer;

B is a hydrophobic, vinyl monomer;

C is a cationic monomer;

x is from about 10 to about 80 mole %;

y is from about 10 to about 80 mole %; and z is from about 2 to about 20 mole %.

15 Claims, No Drawings

INK JET RECORDING ELEMENT

CROSS REFERENCE TO RELATED APPLICATION

Reference is made to commonly-assigned copending U.S. patent application Ser. No. 09/175,132, filed Oct. 19, 1998 entitled Overcoat for Ink Jet Recording Element, by Shaw-Klein et al., the teachings of which are incorporated herein by reference.

FIELD OF THE INVENTION

The present invention relates generally to an ink jet image-recording element which yields printed images with high optical densities, excellent image quality, higher gloss, and fast drying.

BACKGROUND OF THE INVENTION

In a typical ink jet recording or printing system, ink droplets are ejected from a nozzle at high speed towards a recording element or medium to produce an image on the medium. The ink droplets, or recording liquid, generally comprise a recording agent, such as a dye or pigment, and a large amount of solvent. The solvent, or carrier liquid, typically is made up of water, an organic material such as a monohydric alcohol, a polyhydric alcohol or mixtures thereof.

An ink jet recording element typically comprises a support having on at least one surface thereof an ink-receiving or image-recording layer, and includes those intended for reflection viewing, which have an opaque support, and those intended for viewing by transmitted light, which have a transparent support.

While a wide variety of different types of image-recording elements for use with ink jet devices have been proposed heretofore, there are many unsolved problems in the art and many deficiencies in the known products which have severely limited their commercial usefulness. The requirements for an image recording medium or element for ink jet recording are very demanding.

It is well known that in order to achieve and maintain photographic-quality images on such an image-recording element, an ink jet recording element must:

- Be readily wetted so there is no puddling, i.e., coalescence of adjacent ink dots, which leads to nonuniform density
- Exhibit no image bleeding
- Provide maximum printed optical densities
- Exhibit the ability to absorb high concentrations of ink and dry quickly to avoid elements blocking together when stacked against subsequent prints or other surfaces
- Provide a high level of gloss and avoid differential gloss
- Exhibit no discontinuities or defects due to interactions between the support and/or layer(s), such as cracking, repellencies, comb lines and the like
- Not allow unabsorbed dyes to aggregate at the free surface causing dye crystallization, which results in bloom or bronzing effects in the imaged areas
- Have an optimized image fastness to avoid fade from contact with water or radiation by daylight, tungsten light, or fluorescent light Coatings are typically applied to paper when gloss and ink holdout (a barrier to colorant) are required. Such coatings are designed to be insoluble in the ink solvents so that the colorants do not penetrate, causing a matte finish. However, such an approach also prevents the printed images from drying readily, as there is no route for solvent from the ink to the paper.

It is desirable to use a porous material in an ink jet recording element due to its liquid-absorbing capability which yields effective drying. This fast dry-time can enhance the printing efficacy, and in many cases, can improve the printing quality by eliminating the bleeding of two adjacent colors in the print.

DESCRIPTION OF RELATED ART

WO 97/33758 discloses various solution polymers which, when coated on a porous support, allow for higher optical densities than when the inks are printed directly on the porous support surface. However, there is a problem with such solution polymers due to their high swellability, which causes colorants to travel into the coating from the surface to cause low optical densities. If pigmented colorants are used, then cracking of the imaged area may also occur.

Research Disclosure 39524 of March 1997, relates to all-latex coatings for paper and paperboard. It is also disclosed that these all-latex coatings may be used in an ink jet application. However, there is no teaching in this reference of the specific latex polymers used herein.

SUMMARY OF THE INVENTION

In accordance with the present invention, there is provided an ink jet recording element comprising the following layers in the order recited:

I) a support of a solvent-absorbing, porous material, and

II) an image-recording layer comprising a vinyl, latex polymer having the following formula:

$$—A_x—B_y—C_z—$$

wherein:

A is a hydrophilic, vinyl monomer such as hydroxyethylacrylate, hydroxyethylmethacrylate, acrylic acid, methacrylic acid, acrylic acid, vinyl alcohol, acrylamide, methacrylamide or hydroxyethylacrylamide;

B is a hydrophobic, vinyl monomer such as methylacrylate, methylmethacyrlate, butylacrylate, butylmethacrylate, ethylacrylate, ethylmethacrylate, isopropylacrylate, cyclohexylacrylate, norbornylacrylate, vinylacetate, vinylneodeconate or styrene;

C is a cationic monomer such as trimethylammonium ethylacrylate chloride, trimethylammonium ethylacrylate methylsulfate, trimethylammonium methylacrylate chloride, trimethylammonium ethylmethacrylate methylsulfate, methylvinylpyridinium chloride, methylimidazolium iodide or trimethylammonium ethylacrylamide chloride;

x is from about 10 to about 80 mole %;

y is from about 10 to about 80 mole %; and z is from about 2 to about 20 mole %.

The recording element of the invention provides the capability of absorbing liquid from the ink, which ensures fast drying of the ink after printing and eliminates the bleeding between two adjacent colors. Further, the image-recording layer will hold colorants in the top portion of the element to yield a high color density.

DETAILED DESCRIPTION OF THE INVENTION

In a preferred embodiment of the invention, A is a hydrophilic, vinyl monomer that is nonionic at pH 2. In another preferred embodiment, A is an acrylic monomer. In still another preferred embodiment, B is an acrylate monomer. In yet another preferred embodiment, x is from about 20 to about 50 mole %, y is from about 50 to about 70 mole % and z is from about 5 to about 15 mole %.

Examples of the vinyl, latex polymer useful in the invention include the following:

-A-B-C-
x y z

| Latex Polymer | A | x | B | y |
|---|---|---|---|---|
| 1 | Methacrylic acid $CH_2CH(CH_3)COOH$ | 30 | Butyl acrylate $CH_2CHCOOHC_4H_9$ | 60 |
| 2 | Methacrylic acid $CH_2C(CH_3)COOH$ | 15 | Butyl acrylate $CH_2CHCOOHC_4H_9$, | 60 |
| | | | Methyl methacrylate $CH_2C(CH_3)COOCH_3$ | 15 |
| 3 | Methacrylic acid $CH_2C(CH_3)COOH$ | 20 | Methyl methacrylate $CH_2C(CH_3)COOCH_3$ | 70 |
| 4 | Methacrylic acid $CH_2C(CH_3)COOH$ | 10 | Styrene $CH_2CHC_6H_5$ | 80 |
| 5 | Hydroxyethyl methacrylate $CH_2C(CH_3)COOCH_2OH$ | 45 | Butylacrylate $CH_2CHCOOHC_4H_9$ | 45 |
| 6 | Hydroxyethyl methacrylate $CH_2C(CH_3)COOCH_2OH$ | 45 | Methyl methacrylate $CH_2C(CH_3)COOCH_3$ | 45 |
| 7 | Hydroxyethyl methacrylate $CH_2C(CH_3)COOCH_2OH$ | 45 | Methyl methacrylate $CH_2C(CH_3)COOCH_3$ | 45 |
| 8 | Acrylic acid $CH_2CHCOOH$ | 45 | Ethyl methacrylate $CH_2C(CH_3)COOCH_2CH_3$ | 45 |

C in the above polymers 1–6 and 8 is trimethylammonium ethyl methacrylate, chloride salt: $CH_2CH(CH_3)COOC_2H4N(CH_3)\cdot Cl$ and z is 10. C in polymer 7 is trimethylammonium ethyl acrylate, methylsulfate salt: $CH_2CHCOOC_2H_4N(CH_3)_3\cdot(OSO_3CH_3)$ and z is 10.

Any support or substrate may be used in the recording element of the invention provided it is porous. Support materials should be porous so that liquid from the ink may be swiftly carried away from the free surface in order to give the impression of fast print drying. There may be used, for example calendered or uncalendered pulp-based paper, cast coated or clay coated papers, and woven fabrics such as cotton, nylon, polyester, rayon, and the like. In a preferred embodiment of the invention, the support is paper.

In another preferred embodiment of the invention, the support is a microporous material comprising:

(a) a matrix of polyolefin;

(b) finely-divided, substantially water-insoluble filler particles, preferably of which at least about 50 percent by weight are siliceous particles, the filler particles being distributed throughout the matrix and constituting from about 40 to about 90 percent by weight of the microporous material; and (c) a network of interconnecting pores communicating substantially throughout the microporous material, the pores constituting from about 35 to about 95 percent by volume of the microporous material.

Suitable polyolefins useful in the invention include polypropylene, polyethylene, polymethylpentene, and mixtures thereof. Polyolefin copolymers, including copolymers of ethylene and propylene, are also useful. Preferred polyolefin materials include essentially linear ultrahigh molecular weight (UHMW) polyethylene having an intrinsic viscosity of at least 10 deciliters/gram, essentially linear UHMW propylene having an intrinsic viscosity of at least about 6 deciliters/gram, or a mixture thereof.

Many process are known for producing a porous or microporous polyolefin which may be employed in the present invention. Such processes are exemplified by WO 97/22467 and U.S. Pat. Nos. 5,605,750 and 5,244,861, the disclosures of which are hereby incorporated by reference.

Many of the microporous materials used in the recording elements of the present invention are available commercially. Examples include a polyethylene polymer-containing material sold by PPG Industries, Inc., Pittsburgh, Pa. under the trade name of Teslin®, Tyvek® synthetic paper (DuPont Corp.), natural pulp paper, and OPPalyte® films (Mobil Chemical Co.) and other composite films listed in U.S. Pat. No. 5,244,861 discussed above.

The matrix of the microporous material employed in the invention consists of a porous polyolefin which can be extruded, calendered, pressed, or rolled into film, sheet, strip, or web.

As present in the microporous material useful in the invention, the finely-divided, substantially water-insoluble filler particles may be in the form of ultimate particles, aggregates of ultimate particles, or a combination of both. In general, at least about 90 percent by weight of the siliceous particles used in preparing the microporous material have gross particle sizes in the range of from about 5 to about 40 μm, preferably from about 10 to about 30 μm. It is expected that the sizes of filler agglomerates may be reduced during processing of the ingredients to prepare the microporous material. Accordingly, the distribution of gross particle sizes in the microporous material may be smaller than in the raw siliceous filler itself.

Examples of suitable siliceous particles useful in the invention include particles of silica, mica, montmorillonite, kaolinite, asbestos, talc, diatomaceous earth, vermiculite, natural and synthetic zeolites, cement, calcium silicate, aluminum silicate, sodium aluminum silicate, aluminum polysilicate, alumina silica gels, and glass particles. In a preferred embodiment, silica such as precipitated silica, silica gel, or fumed silica, and clays are employed.

In addition to the siliceous particles, finely-divided, substantially water-insoluble non-siliceous filler particles may also be employed. Examples of such optional non-siliceous filler particles include particles of titanium oxide, iron oxide, copper oxide, zinc oxide, antimony oxide, zirconia, magnesia, alumina, molybdenum disulfide, zinc sulfide, barium sulfate, strontium sulfate, calcium carbonate, magnesium carbonate, magnesium hydroxide, and finely divided substantially water-insoluble flame retardant filler particles such as particles of ethylenebis(tetra-bromophthalimide), octabromodiphenyl oxide, decabromodiphenyl oxide, and ethylenebisdibromonorbomane dicarboximide.

As present in the microporous material, the finely-divided, substantially water-insoluble non-siliceous filler particles may be in the form of ultimate particles, aggregates of ultimate particles, or a combination of both. In general, at least about 75 percent by weight of the non-siliceous filler particles used in preparing the microporous material have gross particle sizes in the range of from about 0.1 to about 40 μm.

The support is suitably of a thickness of from about 50 to about 500 μm, preferably from about 75 to 300 μm. Antioxidants, antistatic agents, plasticizers and other known additives may be incorporated into the support, if desired.

In order to improve the adhesion of the image-recording layer to the support, the surface of the support may be subjected to a corona-discharge-treatment prior to applying the image-recording layer.

In addition, a subbing layer, such as a layer formed from a halogenated phenol or a partially hydrolyzed vinyl chloride-vinyl acetate copolymer can be applied to the surface the support to increase adhesion of the solvent-absorbing layer. If a subbing layer is used, it should have a thickness (i.e., a dry coat thickness) of less than about 2 $\mu$m.

The latex coating can be applied to one or both free surfaces of the support materials, depending upon desired gloss and image quality characteristics for each imaging surface. The latex coating may, in turn, be overcoated with any number of desired layers in order to facilitate further control of ink absorption depending upon the exact formulation of the inks to be used in the printing process. Such overcoats may be simultaneously deposited with the latex base layer, or may be coated in subsequent passes as required.

The latex polymer may be deposited on the support by any one of a variety of well known processes. Typically, such coatings could be applied by bead coating, wound wire rod coating, gravure, reverse roll, knife or dip coating, curtain coating, et cetera. Descriptions of such coating methods may be found in "Coating and Drying Defects", By Edgar B. Gutoff and Edward D. Cohen, John Wiley and Sons, 1995.

After application, the coating or coating pack including overcoats, should be fully set if required (either by chill setting, heat setting, or application of a chemical setting agent) and further dried to remove the water and coalesce the latex to the extent that it may be coalesced. For example, if the coverage of the polymeric latex is low enough, it may begin to soak into the substrate pores, leaving few of the particles in intimate enough contact such that they may be effectively coalesced. Such a scenario may be especially useful if only partial support pore plugging is desired so that ink drying times are fast.

While the polymeric latex may be successfully coated from any liquid in which it remains stable, water is a preferred coating solvent due to its innocuous nature. The coating composition may be formulated at any solids content desired to yield a particular dry coverage, but given their relatively low viscosities, polymeric lattices may be coated from high solids, up to 50 weight per cent, such that the wet coverage is low and less energy and time is required to effectively dry the coating. Preferred compositions range from 10–20 weight per cent solids in water. Additives known in the coating art may be included in the coating formulation, such as surfactants, lubricants, defoamers, matte particles, coalescing aids, cross-linkers, and the like.

While the dry coverage of the coated layer may be varied according to need, higher coating coverages yield glossier coatings. Dry coverage of the polymeric latex layer should range from 0.50–10.0 g/m$^2$, but more preferably from 2.0–5.0 g/m$^2$.

Overcoat materials, when necessary, should further enhance the ink-receiving characteristics of the imaging element. Typically, glossy ink receiving layers are preferred from a perceived quality perspective, and several types of glossy, ink absorbing layers have been disclosed. For enhanced absorption of aqueous inks, they include but are not limited to naturally occurring hydrophilic colloids and gums such as gelatin, albumin, guar, xantham, acacia, chitosan, starches and their derivatives, and the like. Derivatives of natural polymers such as functionalized proteins, functionalized gums and starches, and cellulose ethers and their derivatives, have also been successfully demonstrated in glossy ink receiving layers. Synthetic polymers also offer good imaging characteristics. Examples of such materials include polyvinyloxazoline and polyvinylmethyloxazoline, polyoxides, polyethers, poly(ethylene imine), poly(acrylic acid), poly(methacrylic acid), n-vinyl amides including polyacrylamide and polyvinylpyrrolidone, and poly(vinyl alcohol), its derivatives and copolymers. Materials and their water absorption characteristics are described in "Water-Soluble Synthetic Polymers Properties and Behavior, Volumes 1 and 2", by Philip Molyneux, CRC Press, Inc., 1984.

Polymer latex particles, for the purposes of this invention, refers to the result of an emulsion polymerization. This includes both the solid polymer particles suspended in water and any water soluble polymers that may also be present in the water at the end of the reaction. Emulsion polymerization of vinyl monomers is well described in the literature. *Emulsion Polymerization and Emulsion Polymers* by Lovell and El-Asser, and other texts describe various monomers, initiators, surfactants and reaction procedures. Among things not taught in these texts is the control of glossiness in coatings.

Optionally, an additional backing layer or coating may be applied to the backside of a support (i.e., the side of the support opposite the side on which the image-recording layer is coated) for the purposes of improving the machine-handling properties of the recording element, controlling the friction and resistivity thereof, and the like. Typically, the backing layer may comprise a binder and a filler. Typical fillers include amorphous and crystalline silicas, poly(methyl methacrylate), hollow sphere polystyrene beads, micro crystalline cellulose, zinc oxide, talc, and the like. The filler loaded in the backing layer is generally less than 2 percent by weight of the binder component and the average particle size of the filler material is in the range of 5 to 15 $\mu$m, preferably 5 to 10 $\mu$m. Typical binders used in the backing layer are polymers such as acrylates, methacrylates, polystyrenes, acrylamides, poly(vinyl chloride)-poly(vinyl acetate) co-polymers, poly(vinyl alcohol), cellulose derivatives, and the like. Additionally, an antistatic agent also can be included in the backing layer to prevent static hindrance of the recording element. Particularly suitable antistatic agents are compounds such as dodecylbenzenesulfonate sodium salt, octylsulfonate potassium salt, oligostyrenesulfonate sodium salt, laurylsulfosuccinate sodium salt, and the like. The antistatic agent may be added to the binder composition in an amount of 0.1 to 15 percent by weight, based on the weight of the binder.

The image-recording layer may be present in any amount which is effective for the intended purpose. In general, it may be present in an amount of from about 0.5 to about 20 g/m$^2$, preferably from about 1 to about 10 g/m$^2$, which corresponds to a dry thickness of about 0.5 to about 20 $\mu$m, preferably about 2 to about 10 $\mu$m.

In the present invention, when the ink is ejected from the nozzle of the ink jet printer in the form of individual droplets, the droplets pass through the image-recording layer where most of the dyes in the ink are retained or mordanted while the remaining dyes and the solvent or carrier portion of the ink pass freely through the image-recording layer to the solvent-absorbing layer where they are rapidly absorbed by the porous or microporous material. In this manner, large volumes of ink are quickly absorbed by the recording elements of the present invention giving rise to high quality recorded images having excellent optical density and good color gamut.

Ink jet inks used to image the recording elements of the present invention are well-known in the art. The ink compositions used in ink jet printing typically are liquid compositions comprising a solvent or carrier liquid, dyes or pigments, humectants, organic solvents, detergents, thickeners, preservatives, and the like. The solvent or carrier liquid can be solely water or can be water mixed with other water-miscible solvents such as polyhydric alcohols. Inks in which organic materials such as polyhydric alcohols are the predominant carrier or solvent liquid may also be used. Particularly useful are mixed solvents of water and polyhydric alcohols. The dyes used in such compositions are typically water-soluble direct or acid type dyes. Such liquid compositions have been described extensively in the prior art including, for example, U.S. Pat. Nos. 4,381,946; 4,239,543 and 4,781,758, the disclosures of which are hereby incorporated by reference.

Although the recording elements disclosed herein have been referred to primarily as being useful for ink jet printers, they also can be used as recording media for pen plotter assemblies. Pen plotters operate by writing directly on the surface of a recording medium using a pen consisting of a bundle of capillary tubes in contact with an ink reservoir.

The image-recording layer used in the recording elements of the present invention can also contain various known additives, including matting agents such as titanium dioxide, zinc oxide, silica and polymeric beads such as crosslinked poly(methyl methacrylate) or polystyrene beads for the purposes of contributing to the non-blocking characteristics of the recording elements used in the present invention and to control the smudge resistance thereof; surfactants such as non-ionic, hydrocarbon or fluorocarbon surfactants or cationic surfactants, such as quaternary ammonium salts for the purpose of improving the aging behavior of the ink-absorbent resin or layer, promoting the absorption and drying of a subsequently applied ink thereto, enhancing the surface uniformity of the ink-receiving layer and adjusting the surface tension of the dried coating; fluorescent dyes; pH controllers; anti-foaming agents; lubricants; preservatives; viscosity modifiers; dye-fixing agents; waterproofing agents; dispersing agents; UV-absorbing agents; mildew-proofing agents; mordants; antistatic agents, anti-oxidants, optical brighteners, and the like. Such additives can be selected from known compounds or materials in accordance with the objects to be achieved.

The following examples are provided to illustrate the invention.

EXAMPLES

Synthesis of polymeric latexes.

Polymer 1 was made by purging 250 mL of distilled water with nitrogen in a 1L 3-neck reaction flask equipped with an overhead stirrer and an addition/inlet adapter. Ethoquod® O/12 (1.26 g), available from Armak Chemicals, was added to the nitrogen purged water. The reaction flask was then warmed to and held at 80° C. Distilled water, 115 mL, was purged with nitrogen in a 2L 3-neck addition funnel equipped with an overhead stirrer and pump. To the nitrogen purged water was added, in this order, 1.26 g Ethoquod® O/12, trimethylammoniumethyl acrylate, hydrochloride salt (20.8 g, 0.1 mole), butyl acrylate (77 g, 0.6 mole), methylmethacrylate (15 g, 0.15 mole.) and methacrylic acid (13 g, 0.15 mole). The monomers were stirred with the water and surfactant for fifteen minutes. Initiator, 2,2'-azobis(2-methylpropionamidine)-dihydrochloride, (1.26 g) was added to the reaction flask and monomer addition started immediately at a rate of 7 L/mmin. When the addition of monomer was complete, another 1.26 g of the initiator was added to the reaction flask and the reaction mixture stirred at 80° C. for two hours. The flask was then removed from the heat and cooled before filtering through polypropylene filter media. This latex was 24.1% solids and had a particle size of 210 nm. The isolated polymer had a Tg of 21° C.

Polymer 2 was made in the same way as polymer 1, except using 1.7 g of the same surfactant in both reaction vessel and monomer feed, 2.4 g of the same initiator and the following monomers and amounts in the feed: butyl acrylate (154 g, 1.2 moles); methacrylic acid (52 g, 0.6 moles); trimethylammonium ethyl acrylate, hydrochloride salt (52 g, 0.2 moles). The resulting latex was 24.5% solids, and had a particle size of 108 nm. The isolated polymer had a Tg of 4° C.

Examples 1–4—Invention

Ink Make Procedure:

| Mill Grind | |
|---|---|
| Polymeric beads, mean diameter of 50 μm (milling media) | 325.0 g |
| Black Pearls 880 (Cabot Chemical Company) (C.I. Pigment Black 7) | 30.0 g |
| Oleoyl methyl taurine, (OMT) sodium salt | 10.5 g |
| Deionized water | 209.5 g |
| Proxel ® GLX biocide (Zeneca Colours) | 0.2 g |

The above components were milled using a high energy media mill manufactured by Morehouse-Cowles Hochmeyer. The mill was run for 8 hours at room temperature. The particle size distribution was determined using a Leeds and Northrup Ultra Particle Size Analyzer (UPA). The D50 (50% of the particles were smaller than this value) of the millgrind was about 0.080 μm.

An ink was formulated from the above millgrind such that the final formulation contained the following quantities (per cents are by weight):

Pigment: 2.15%

OM T: 0.54%

Proxel GXL: 31 parts per million

Strodex® PK-90 (Dexter Chemicals Corporation): 0.30%

Diethylene Glycol: 12.0%

Triethanolamine: as required to raise pH to 8.0

High purity water: balance

Polymers 1 and 2 of the invention were bead coated directly on porous, voided polyethylene (Teslin® SPID, PPG Inc.) to form films with a dry coverage of 4.3 g/m$^2$. They were dried thoroughly by forced air heating.

They were imaged using a pigmented black ink described above using an Eastman Kodak Digital Science 2042 printer. The gloss of the unprinted area was measured using a BYK-Gardner microglossmeter, set at an angle of incidence of 85 degrees to the print normal. The optical density of the printed black patch was measured using an X-rite densitometer. The results are shown in Table 1 below.

Examples 5–12-comparison or Controls

Example 1 was repeated but using the following comparison or control polymers:

PVA: Polyvinyl alcohol, Elvanol 52/22 (DuPont)

PVP: Polyvinylpyrrolidone, PVP K90 (International Specialty Products) (WO 97/33758 referred to above)

PAAm-COOH: Carboxylated polyacrylamide, (Aldrich Chemical Company Incorporated)

Starch: ECO polysaccharide resin (Lorama Chemicals Inc.)

Pectin: Practical grade (Acros Organic Company)

FlocAid 19: Cationically modified acrylic dispersion (Alco Chemical)

Witco W213: Polyurethane latex (Witco Corporation) (hydrophobic latex polymer)

The following results were obtained:

TABLE 1

| Example | Polymer | % solids | Optical Density | Gloss (unprinted) |
|---|---|---|---|---|
| 1 | Polymer 1 | 15 | 1.78 | 36 |
| 2 | Polymer 2 | 20 | 2.38 | 35 |
| 3 | Polymer 2 | 15 | 2.21 | 34 |
| 4 | Polymer 2 | 10 | 2.36 | 38 |
| Comp. 5 | PVA | 7 | 0.99 | 22 |
| Control 6 | PVP | 10 | 1.06 | 28 |
| Comp. 7 | PAAm-COOH | 5 | 0.81 | 27 |
| Comp. 8 | Starch | 10 | 1.02 | 8 |
| Comp. 9 | Pectin | 5 | 1.24 | 22 |
| Comp. 10 | FlocAid 191 ® | 10 | 0.94 | 42 |
| Comp. 11 | Witco W2l3 | 15 | * | 24 |
| Comp. 12 | (uncoated) | — | 0.74 | 10 |

*The optical density of the printed area was not measured due to severe bleed and pooling of the ink.

The above results show that use of the materials of the invention result in a combination of high gloss and printed optical density compared to the comparison and control materials which are not latex materials or are hydrophobic latex materials.

Examples 13–17

Examples 13–15 of the invention were prepared on Teslin SPID (porous support similarly to those above, except that an additional layer was deposited in a second coating pass in some of the cases as described. The image-recording layer of the invention comprised 4.3 g/m$^2$ of Polymer 2 described above. Comparison examples 16 and 17 were prepared with and without an overcoat layer or the image-recording layer of the invention as shown below.

Overcoat A: 1.1 g/m$^2$ of a combination of 20 weight % methyl cellulose (Methocel® A4M, Dow Chemical Company), 80 weight % cationically modified hydroxyethylcellulose (Quatrisoft® LM200 Amerchol Corporation)

Overcoat B: 3.3 g/m$^2$ of a combination of 90 weight % gelatin (photographic grade lime processed ossein gelatin, Eastman Gelatin) and 10 weight % co-poly(N-vinylbenzyl-N,N,N-trimethylammonium chloride-co-ethylene glycol dimethacrylate) 93/7 molar ratio.

Patches of 100% fill were printed for each primary color using Encad® GA dye-based inks on a Novajet® printer. The optical density of each patch was measured using and X-rite densitometer. The following results were obtained:

TABLE 2

| Example | Colorant Barrier Layer | Over-coat | Cyan Optical Density | Magenta Optical Density | Yellow Optical Density | Black Optical Density |
|---|---|---|---|---|---|---|
| 13 | Yes | None | 1.27 | 1.45 | 1.22 | 1.69 |
| 14 | Yes | A | 1.56 | 1.74 | 1.86 | 2.23 |
| 15 | Yes | B | 2.14 | 1.91 | 2.11 | N/A |
| Comp. Ex 16 | None | A | 1.29 | 1.10 | 1.24 | 1.36 |
| Comp. Ex 17 | None | None | 0.94 | 0.85 | 0.80 | 0.92 |

The above result show that use of the materials of the invention result in higher optical densities as compared to the comparison elements.

Examples 18–22

The following examples show the effectiveness of the invention when coated on pulp-based paper. The paper used was a 30 pound support, pulp-based paper which had been calendered, 157 μm thick. The base layers were coated and dried as described previously for voided polyethylene (Teslin®) support to yield a dried coverage of 2.2 g/m$^2$.

The following comparison material was used:

AQ55: Sulfonated polyester dispersion (Eastman Chemicals Co.)

The following control material was used:

Chromaset® 600: Styrene-acrylic dispersion (Hercules Incorporated) (hydrophobic latex)

In each case, the overcoats were applied in a second coating pass. The overcoats comprise a two layer system, in which the layers were coated simultaneously. The bottom most layer, in contact with the base layer described herein, is of the composition of "Overcoat B" above, while the topmost layer is of the composition of "Overcoat A" above. The dry coverage of the bottom most overcoat layer is 8.6 g/m$^2$, while the topmost overcoat layer's coverage is 1.1 g/m$^2$. Gloss was measured for each coated combination at 60 degrees to the paper normal and 85 degrees to the paper normal. The following results were obtained:

TABLE 3

| Example | Base layer | Over-coats | Gloss at 60 degrees | Gloss at 85 degrees |
|---|---|---|---|---|
| 18 | Polymer 2 | Yes | 29 | 35 |
| Comp. Ex 19 | None | No | 7 | 22 |
| Comp. Ex 20 | None | Yes | 15 | 20 |
| Comp. Ex 21 | AQ55 | Yes | 20 | 24 |
| Control Ex 22 | Chromaset ® 600 | Yes | 20 | 24 |

The above results show that use of the materials in accordance with the invention provide higher gloss than when no colorant barrier layer is used or when a comparison or control hydrophobic latex polymer is used.

Although the invention has been described in detail with reference to certain preferred embodiments for the purpose of illustration, it is to be understood that variations and modifications can be made by those skilled in the art without departing from the spirit and scope of the invention.

What is claimed is:

1. An ink jet recording element comprising the following layers in the order recited:

I) a support of a solvent-absorbing, micro porous material comprising:

(a) a matrix of polyolefin;

(b) finely-divided, substantially water-insoluble filler particles distributed throughout said matrix and constituting from about 40 to about 90 percent by weight of said microporous material; and (c) a network of interconnecting pores communicating substantially throughout said microporous material, said pores constituting from about 35 to about 95 percent by volume of said microporous material, and II) an image-recording layer comprising a vinyl, latex polymer having the following formula:

$$—A_x—B_y—C_z—$$

wherein:

A is a hydrophilic, vinyl monomer;

B is a hydrophobic, vinyl monomer;

C is a cationic monomer;

x is from about 10 to about 80 mole %;

y is from about 10 to about 80 mole %; and z is from about 2 to about 20 mole %.

2. The recording element of claim 1 wherein A is a hydrophilic, vinyl monomer that is nonionic at pH 2.

3. The recording element of claim 1 wherein A is an acrylic monomer.

4. The recording element of claim 1 wherein A is hydroxyethylacrylate, hydroxyethylmethacrylate, acrylic acid, methacrylic acid, acrylic acid, vinyl alcohol, acrylamide, methacrylamide or hydroxyethylacrylamide.

5. The recording element of claim 1 wherein B is an acrylate monomer.

6. The recording element of claim 1 wherein B is methylacrylate, methylmethacrylate, butylacrylate, butylmethacrylate, ethylacrylate, ethylmethacrylate, isopropylacrylate, cyclohexylacrylate, norbornylacrylate, vinylacetate, vinylneodeconate or styrene.

7. The recording element of claim 1 wherein C is trimethylammonium ethylacrylate chloride, trimethylammonium ethylacrylate methylsulfate, trimethylammonium methylacrylate chloride, trimethylammoniumethylmethacrylrate methylsulfate, methylvinylpyridinium chloride, methylimidazolium iodide or trimethylammonium ethylacrylamide chloride.

8. The recording element of claim 1 wherein x is from about 20 to about 50 mole %.

9. The recording element of claim 1 wherein y is from about 50 to about 70 mole %.

10. The recording element of claim 1 wherein z is from about 5 to about 15 mole %.

11. The element of claim 1 wherein said filler particles are at least about 50 percent by weight siliceous particles.

12. The element of claim 11 wherein said siliceous particles are silica particles.

13. The element of claim 1 wherein said image-recording layer is present in an amount of from about 0.5 to about 20 $g/m^2$.

14. The element of claim 1 wherein said image-recording layer is present in an amount of from about 1 to about 10 $g/m^2$.

15. An ink jet printing process comprising:

a) providing an ink jet recording element according to claim 1, and b) applying liquid ink droplets thereon in an image-wise manner.

* * * * *